United States Patent [19]

Thornton

[11] Patent Number: 5,917,906
[45] Date of Patent: Jun. 29, 1999

[54] TOUCH PAD WITH TACTILE FEATURE

[75] Inventor: Curtis W. Thornton, Cary, N.C.

[73] Assignee: Ericsson Inc., Research Triangle Park, N.C.

[21] Appl. No.: 08/941,694

[22] Filed: Oct. 1, 1997

[51] Int. Cl.⁶ .................................................. H04M 1/00
[52] U.S. Cl. ........................... 379/433; 379/428; 379/368
[58] Field of Search .................................. 379/433, 434, 379/428, 368, 419; 200/512

[56] References Cited

U.S. PATENT DOCUMENTS

| | | | |
|---|---|---|---|
| 4,916,275 | 4/1990 | Almond | 200/512 |
| 5,337,346 | 8/1994 | Uchikura | 455/556 |
| 5,357,065 | 10/1994 | Mitamura et al. | 200/512 |
| 5,371,790 | 12/1994 | Nevo | 379/433 |
| 5,584,054 | 12/1996 | Tyneski et al. | 455/89 |

*Primary Examiner*—Jack Chiang
*Assistant Examiner*—David Huynh
*Attorney, Agent, or Firm*—Myers Bigel Sibley & Sajovec, P.A.

[57] ABSTRACT

A touch pad assembly for portable communication devices has a dual entry user interface surface and is configured to overlay a touch pad surface. The touch-pad assembly can operate in both a key entry and graphical (written) input mode via the same input surface. In the key entry mode, the touch-pad assembly provides tactile feedback to the user affirming the selected key input.

44 Claims, 2 Drawing Sheets

TOUCH PAD WITH TACTILE FEATURE

FIELD OF THE INVENTION

The present invention relates generally to portable communication devices, and more particularly relates to user interfaces for portable communication devices.

BACKGROUND OF THE INVENTION

Portable electronic communication devices such as personal organizers and radiotelephones continue to grow in popularity. In order to improve transportability, it is generally desired that these portable devices be lightweight and compact. This, in turn, generally dictates a slim and miniaturized product configuration. Accordingly, some devices have incorporated touch-pads to replace conventional keypad and switch assemblies. Touch-pads typically overlay printed circuit boards and electrically connect at one end of the device, consuming little board space and providing a thin assembly. Unfortunately, although touch pads allow for thinner product configurations, users must typically visually affirm their entry by viewing a display on the device. In addition, many consumers prefer tactile feedback (similar to a clicking response) to a key entry or input.

In the past, some designs have attempted to resolve the tactile feedback problem by providing a removable keypad assembly. Thus, in such a device, a user can graphically enter (write, draw and the like) on the touch pad surface of the device using a writing tool such as a stylus, or insert the keypad assembly into the device to overlay the touch-pad surface and enter data via the keypad entry surface. Unfortunately, such a design involves removing components which may be subsequently misplaced or lost. Further disadvantageous, pulling and pushing on the assembly to insert and remove same can add stress or fatigue to the assembly interconnections.

U.S. Pat. No. 5,584,054 to Tyneski et al. has attempted to resolve the separate component problem by providing a hinged assembly. As described, the keypad flips away from the touch-pad via the hinge. However, the device includes two separate entry surfaces and still requires a user to reposition the keypad over the touch-pad for key entry.

OBJECTS AND SUMMARY OF THE INVENTION

It is therefore an object of the present invention to provide an improved user interface for a communication device.

It is a further object of the present invention to provide with an improved user interface for a communication device with a touch pad input without requiring removal or replacement of a separate keypad assembly.

It is an additional object of the invention to provide an improved user interface for operating a radiotelephone with a touch-pad surface.

It is a further object of the invention to provide a radiotelephone with a tactile feature which does not require removal or replacement of a keypad assembly.

These and other objects, advantages, and features are provided by an integrated touch-pad assembly having tactile feedback and a user interface pad with both a key and graphical entry capability. In particular, a first aspect of the present invention is a radiotelephone with a touch pad having tactile features associated therewith. The radiotelephone comprises a radiotelephone body having a face with a touch pad surface. The radiotelephone also includes an array of snap domes arranged in predetermined spaced-apart alignment to contact the touch pad surface and a spacer sheet overlaying the snap dome array opposite the radiotelephone body. The spacer sheet includes a plurality of apertures for receiving selected ones of the domes therein. The radiotelephone also includes a dual key and graphic entry pad overlaying the spacer sheet opposite the snap dome array. The entry pad includes a plurality of key entry surfaces thereon. Each of the plurality of key entry surfaces is aligned with respective ones of the domes received in the spacer sheet. Advantageously, in response to a user's depression of one of the key entry surfaces, the dome provides tactile affirmation of the selection to the user and relays the selection to the touch pad surface. Preferably, the key entry surfaces are configured on the entry pad as a substantially planar continuous surface to facilitate a smooth graphic entry surface for a user.

In a preferred embodiment, the array of snap domes is configured as a snap dome sheet so as to position a plurality of upwardly extending domes in positive retention to provide an absolute location of the domes relative to the spacer sheet and touch pad surface. Each of the domes contacts the touch pad surface to define a contact zone representing a corresponding keypad entry. Thus, in a preferred embodiment, the radiotelephone includes two modes of operation controllable by a user selectable switch, a key entry mode and a graphic entry mode.

Another aspect of the present invention is a portable communication device which comprises a device body having a face with a touch pad surface thereon. The device also includes a touch pad assembly similar to that described above. The touch pad assembly includes an array of snap domes arranged in spaced-apart alignment positioned on the device body to contact the touch pad surface and a spacer sheet overlaying the snap dome array opposite the device body. The spacer sheet includes a plurality of apertures, each of the apertures configured to receive a corresponding one of the domes therein. The device also includes a dual key and graphic entry pad overlaying the spacer sheet opposite the snap dome sheet. The entry pad includes a plurality of key entry surfaces and each of the key entry surfaces is aligned with a respective one of the domes. One of the domes, responsive to a user's depression of the corresponding key entry surface travels a predetermined distance towards the touch pad surface to provide tactile affirmation of the selection to the user and relay the selection to the said touch pad surface. Preferably, the dome is configured and sized to resist the depression a sufficient amount to provide a clicking tactile feedback to the user. In a preferred embodiment, the key entry surface and the corresponding dome define a contact zone on the touch pad which is associated with the appropriate key entry when the key entry input mode is selected. Thus, the engagement of the contact zone is recognized by the device as a keyed entry corresponding to the key entry surface on the entry pad.

Yet another aspect of the present invention is a touch-pad assembly. The touch pad assembly comprises an array of protrusions such as snap domes having opposing top and bottom surfaces. The bottom surface is configured to overlay and contact a touch-pad surface. The touch pad assembly also includes a spacer sheet overlaying and contacting the top surface of the array. The spacer sheet includes a plurality of apertures and each of the apertures is configured and sized to receive at least one of domes in the array of snap domes therein. The touch pad assembly also includes a dual key and graphic entry pad overlaying the spacer sheet opposite the array of snap domes. The dual entry pad includes a plurality of key entry surfaces thereon. The assembly is configured to engage with a touch-pad surface such that in response to a user's depression of one of the key entry surfaces the assembly provides tactile affirmation of the selection to the user and relays the selection to the touch-pad surface. Preferably, the dual entry pad with the key entry surfaces has a substantially planar continuous surface to facilitate a smooth graphic entry surface for a user.

In a preferred embodiment, the array of protrusions or snap domes is a snap dome sheet configured to position a plurality of upwardly extending domes in positive retention and each of the domes contacts the touch pad surface to define a contact zone representing a corresponding key pad entry.

In another preferred embodiment, the spacer sheet has a top surface which contacts the dual entry keypad and the domes are configured and sized such that they extend into the spacer sheet apertures to be substantially flush with or below the top surface. This configuration will provide sufficient support for the entry pad relative to the spacer sheet and domes, and allow a smooth top surface on the entry pad further facilitating graphic input alongside tactile feedback for keypad entry on the same surface.

Advantageously, the dual entry pad allows both the graphical and key entry on the same surface. This combination input surface provides desired tactile features for a user interface, a slim product package, and an improved user interface which no longer requires removing and positioning separate components relative to the touch-pad to obtain the tactile feedback for the touch pad input surface.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. In the figures, certain thicknesses may be exaggerated for clarity.

Figure 1:
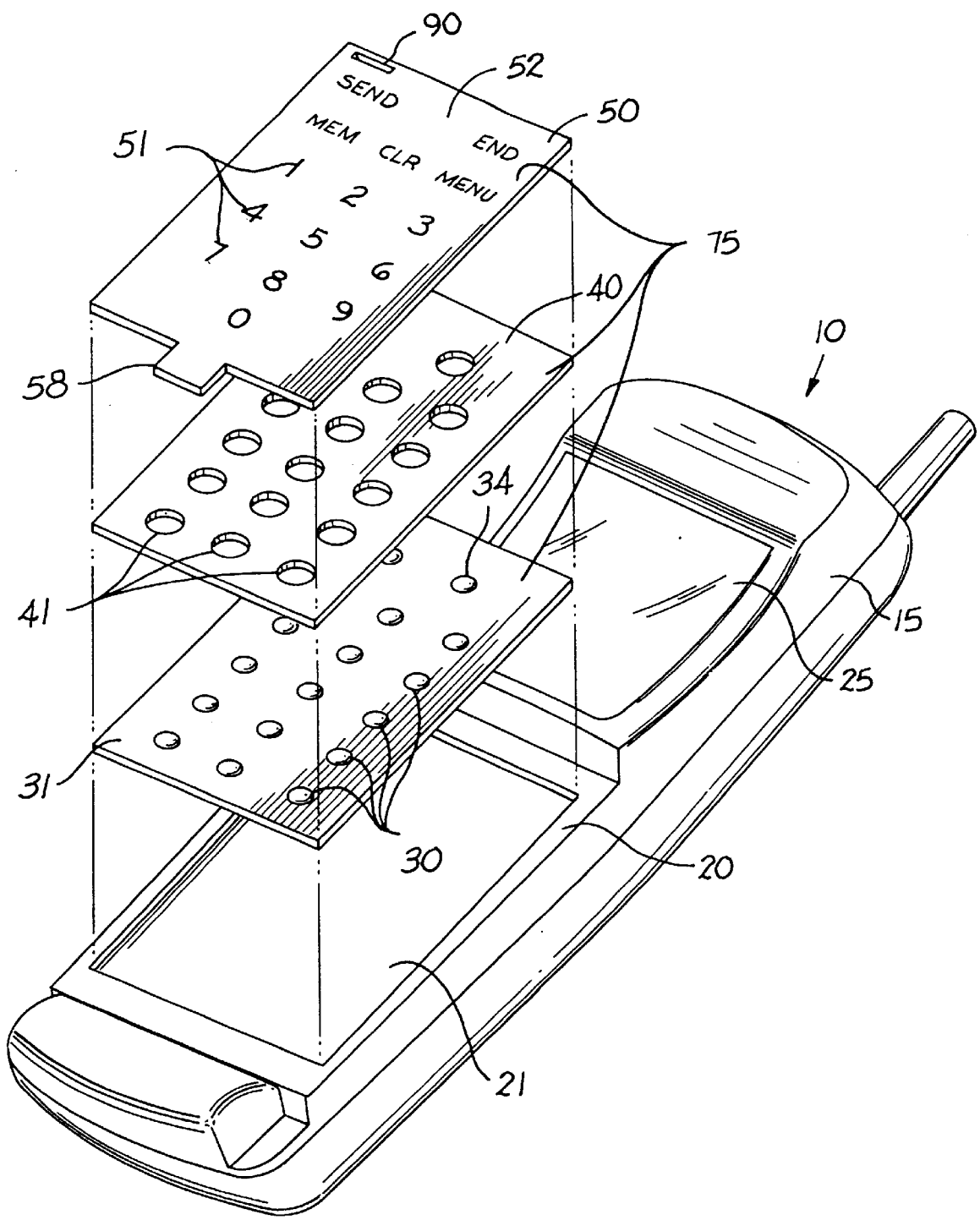
FIG. 1 is an exploded view of a radiotelephone with a touch pad assembly according to a preferred embodiment of the present invention.

The present invention is directed towards user interfaces for portable electronic communication devices such as personal organizers, radiotelephones, and the like. The interface is particularly suitable for small compact radiotelephones. Referring now to FIG. 1, a radiotelephone 10 with a user accessible face 20 is shown. The face 20 is positioned in the radiotelephone housing 15 so as to be exposed to the user during operation. The radiotelephone face 20 includes a touch pad surface 21. As shown in FIG. 1, the radiotelephone face 20 also includes a display window 25 preferably positioned adjacent the touch pad surface 21. The display window 25 can display scrolled menus, messages, or other information generated via the user interface. A touch pad assembly 75 is positioned to overlay the touch-pad surface 21. The touch pad assembly 75 may provide the primary (or only) user interface on the device and, as will be discussed further below, is advantageously configured to allow both key entry and graphical entry on the same entry pad 50.

Figure 2:
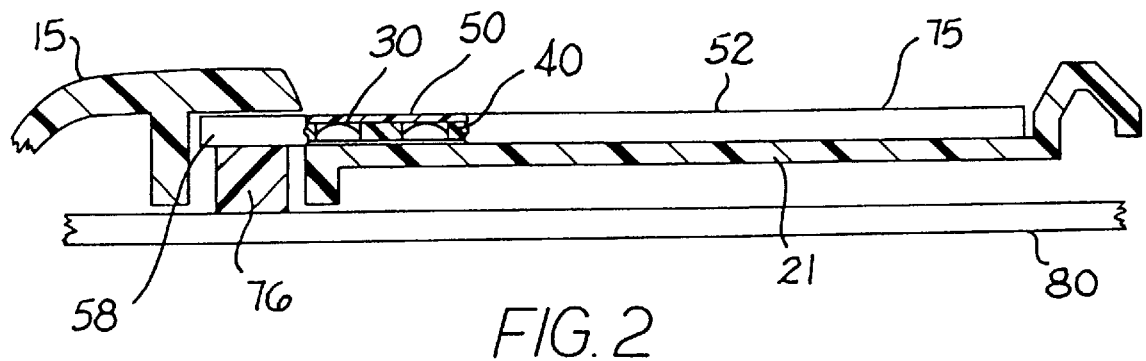
FIG. 2 is a partial sectional view of a touch pad assembly positioned in a communication device according to the present invention.
Figure 3:
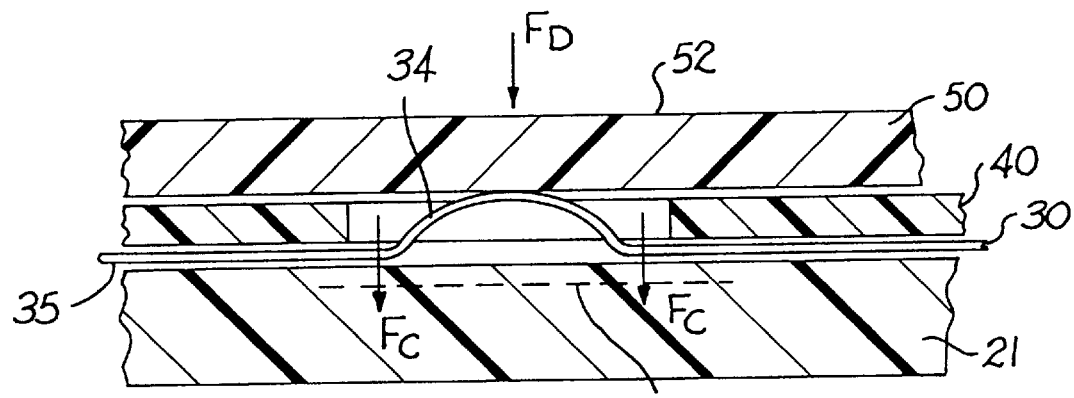
FIG. 3 is a greatly enlarged view of a touch pad assembly contacting a touch-pad display according to the present invention.
Figure 4:
FIG. 4 is a top view of a contact dome according to one embodiment of the present invention.
Figure 5:
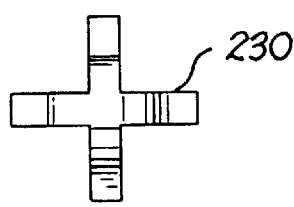
FIG. 5 is a top view of a contact dome of an additional embodiment of the present invention.
Figure 6:
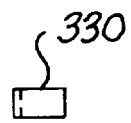
FIG. 6 is a top view of a contact dome according to yet another embodiment of the present invention.
Figure 4A:
FIG. 4A is a side view of the contact dome of FIG. 4.
Figure 5A:
FIG. 5A is a side view of the contact dome of FIG. 5.
Figure 6A:
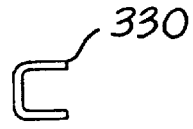
FIG. 6A is a side view of the contact dome of FIG. 6.

The touch pad assembly 75 includes an array of snap domes 30, a spacer sheet 40, and a dual entry pad 50. As illustrated in FIG. 2, the touch pad assembly 75 is electrically connected at one end 58 through an electrical connection 76 to a printed circuit board 80 and/or other electronic devices disposed in the radiotelephone housing 15. As shown in FIG. 1, the array of snap domes 30 is preferably configured as a continuous sheet 31. In a preferred embodiment, as shown in FIGS. 1 and 3, each of the snap domes 30 is configured with an upwardly extending contact partial spherical dome surface 34 and a planar bottom surface 35. In operation, the upwardly extending portion 34 is configured to provide tactile feedback (such as a snap or click) to a user in response to depression of a key entry surface 51, while the planar bottom surface 35 defines a contact zone on the touch pad surface 21 representing the selected key entry as will be discussed further below. However, alternative configurations and shapes can also be employed. Exemplary tactile contact shapes are shown, but are not limited to, those shown in FIGS. 4, 5, and 6. FIGS. 4 and 4A illustrate a radial strip 130, FIGS. 5 and 5A illustrate a skeletal dome 230, and FIGS. 6 and 6A show a "C" channel 330. Thus, it will be appreciated by those of skill in the art that the term "snap dome" as used herein is used to generally describe contact protrusions of numerous shapes.

The array 30 can be conductive or non-conductive and can be formed by a continuous polydome sheet or by separate metal dome components positioned in an array configuration. Preferably, if separate metal (or semi-rigid, but resilient) dome components are employed then alternative positioning means such as a tape overlay or other anchoring sheet can be used to hold the domes in the proper array configuration. Alternatively, the domes 30 can be inserted into the corresponding aperture 41 without a separate support sheet. In this embodiment, the dome base 35 can provide the contact perimeter for the touch pad surface and is preferably configured in the spacer sheet to be substantially flush with the bottom of the spacer sheet 40 so as to minimize any undue pressure on the touch pad surface 21. Indeed, the spacer sheet 40 can be counter bored to fit the dome base 35 therein (not shown). In addition, if the device is to be used in a hot environment, the polydome may degrade over time, and as such it is preferred that metal domes be used in these applications.

In any event, as shown in FIG. 3, the snap domes 30 are positioned in the device (shown as a radiotelephone 10) such that the base or planar bottom surface 35 of the domes 30 contacts the touch pad surface 21. As such, each of the domes 30 contacts the touch pad surface 21 and defines a contact zone 95 thereabout, each contact zone 95 corresponding to the key entry surface 51 associated with a predetermined location on the touch pad surface 21. The upwardly extending portion 34 of the snap dome 30 is sized and configured to be received into one of the plurality of apertures 41 in the spacer sheet 40. Preferably, the spacer sheet 40 includes one aperture 41 for each of the domes 30. This configuration provides underlying support for the writing entry surface 52 and allows the tactile response in the key entry mode according to the instant invention. Of course, as will be appreciated by those of skill in the art, alternative spacer aperture 41 shapes can be employed.

As shown in FIG. 3, the upwardly extending portion 34 of the dome is preferably flush (or below) the top surface of the spacer sheet 40. This configuration will provide a substantially planar entry surface 52.

Referring again to FIG. 1, the entry pad 50 includes a dual entry surface 52 which is substantially continuous, smooth, and flat or planar. This will provide a graphic input surface as well as a key entry surface. The entry pad 50 includes a plurality of key entry surfaces 51 representing predetermined characters (shown as numerals and functions). The key entry surfaces 51 are aligned with contacting contact domes 30. Therefore, as shown in FIG. 3, when in the key entry mode, a user depresses the selected key entry surface 51 with a depression force (FD) and the dome 30 transmits a depression contact force (Fc) through the dome base 35 to the touch pad surface 21. This contact force Fc activates the contact zone 95 on the touch pad surface 21 designated to represent the corresponding key entry surface.

The device 10 also includes a user selection switch 90 (FIG. 1). As is well know to those of skill in the art, the switch 90 can be a "hard" or "soft" key. The device preferably includes two modes of operation which is controllable by a user via the switch 95, a key entry mode and a graphic entry mode. In the key entry mode, the key entry surfaces 51 define an absolute position area on the touch pad surface 21 such that the device recognizes the key character entry associated with the corresponding position or contact zone 95. In contrast, in the non-key entry mode (graphic entry mode) a user can draw or write on the entry surface 52 and the touch pad surface 21 responds to recognize the input via a relative position area. As is well known to those of skill in the art, one way of implementing the contact zone recognition area is with software operably associated with the touch pad assembly 75.

An exemplary method of operation of a user interface according to the present invention allows, upon activation of the device, a user to select a desired entry mode on a single keypad. One entry mode (the key entry mode) allows typical operation of a key entry mode via the dual entry input pad. The other entry mode (the graphic entry mode) allows the user to select a graphic mode entry through which the graphic input is made through the same entry keypad.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A radiotelephone with a touch pad having tactile features associated therewith, said radiotelephone comprising:
   a radiotelephone body having a face with a touch-pad surface thereon;
   an array of snap domes arranged in predetermined spaced-apart alignment to contact said touch-pad surface;
   a spacer sheet overlaying said snap dome array opposite said radiotelephone body, said spacer sheet including a plurality of apertures for receiving selected ones of said domes therein; and
   a user input interface comprising a key and graphic entry pad overlaying said spacer sheet opposite said snap dome array, said entry pad including a plurality of key entry surfaces thereon, each of said plurality of key entry surfaces are aligned with respective ones of said domes received in said spacer sheet, wherein responsive to a user's depression of one of said key entry surfaces said dome provides tactile affirmation of the selection to the user and relays the selection to said touch-pad surface.

2. A radiotelephone according to claim 1, wherein said plurality of key entry surfaces are configured on said entry pad as a substantially planar continuous surface to facilitate a smooth graphic entry surface for a user.

3. A radiotelephone according to claim 2, wherein said array of snap domes is a snap dome sheet configured to position a plurality of upwardly extending domes in positive retention.

4. A radiotelephone according to claim 1, wherein each of said domes contacts said touch pad surface to define a contact zone representing a corresponding keypad entry.

5. A radiotelephone according to claim 1, wherein said radiotelephone includes two modes of operation controllable by a user selectable switch.

6. A radiotelephone according to claim 5, wherein said two modes of operation include a key entry mode and a graphic entry mode.

7. A radiotelephone according to claim 1, wherein said radiotelephone includes a display window.

8. A radiotelephone according to claim 3, wherein said spacer sheet has a top surface which contacts said entry keypad, and wherein said domes are configured and sized such that they extend into said spacer sheet apertures to be substantially flush with said top surface.

9. A radiotelephone according to claim 3, wherein said spacer sheet has a top surface which contacts said entry keypad, and wherein said domes received in said spacer sheet apertures are below said top surface.

10. A portable communication device, comprising:
    a device body having a face with a touch pad surface thereon;
    an array of snap domes arranged in spaced-apart alignment positioned on said body to contact said touch pad surface;
    a spacer sheet overlaying said snap dome array opposite said body; said spacer sheet including a plurality of apertures, each of said apertures configured to receive a corresponding one of said domes therein; and a user input interface comprising a key and graphic entry pad overlaying said spacer sheet opposite said snap dome sheet, said entry pad including a plurality of key entry surfaces thereon, wherein each of said plurality of key entry surfaces are aligned with a respective one of said domes, wherein responsive to a user's depression of one of said key entry surfaces, said respective dome travels a predetermined distance towards said touch pad surface to provide tactile affirmation of the selection to the user and relay the selection to the said touch pad surface.

11. A communication device according to claim 10, wherein said device includes a radiotelephone.

12. A communication device according to claim 11, wherein said device entry pad is configured to output numbers input by a user for operating said radiotelephone.

13. A communication device according to claim 10, wherein said plurality of key entry surfaces are configured on said entry pad as a substantially planar continuous surface to facilitate a smooth graphic entry surface.

14. A communication device according to claim 10, wherein said array of snap domes is configured as a snap dome sheet to position a plurality of upwardly extending domes in positive retention.

15. A communication device according to claim 10, wherein said device includes two modes of operation controllable by a user selectable switch.

16. A communication device according to claim 15, wherein said two modes of operation include a key entry mode and a graphic entry mode.

17. A communication device according to claim 16, wherein each of said domes contacts said touch pad surface to define a contact zone representing a corresponding key pad entry when said device is in said key entry mode.

18. A communication device according to claim 11, wherein said device includes a display window adjacent said touch pad surface.

19. A communication device according to claim 17, wherein said spacer sheet has a top surface which contacts said entry keypad, and wherein said domes are configured and sized such that they extend into said spacer sheet apertures to be substantially flush with said top surface.

20. A communication according to claim 17, wherein said spacer sheet has a top surface which contacts said entry keypad, and wherein said domes received in said spacer sheet apertures are below said top surface.

21. A touch-pad assembly, comprising:
an array of protrusions having opposing top and bottom surfaces, said bottom surface configured to overlay and contact a touch-pad surface;
a spacer sheet overlaying and contacting said array top surface, said spacer sheet including a plurality of apertures, each of said apertures configured and sized to receive at least one of said array of protrusions therein; and
a user input interface comprising a key and graphic entry pad overlaying said spacer sheet opposite said array of protrusions, said entry pad including a plurality of key entry surfaces thereon, wherein said assembly is configured to engage with a touch-pad surface such that in response to a user's depression of one of said key entry surfaces said assembly provides tactile affirmation of the selection to the user and relays the selection to the touch-pad surface.

22. A touch-pad assembly according to claim 21, wherein said entry pad with said key entry surfaces has a substantially planar continuous entry surface to facilitate a smooth graphic entry surface for a user.

23. A touch-pad assembly according to claim 21, wherein said array of protrusions is an array of snap domes.

24. A touch-pad assembly according to claim 23, wherein said array is configured as a snap dome sheet configured to position a plurality of upwardly extending domes in positive retention.

25. A touch-pad assembly according to claim 24, wherein each of said domes contacts said touch pad surface to define a contact zone representing a corresponding keypad entry.

26. A touch-pad assembly according to claim 23, wherein said key entry pad is configured to provide two modes of operation controllable by a user selectable switch.

27. A touch-pad assembly according to claim 26, wherein said two modes of operation include a key entry mode and a graphic entry mode.

28. A touch-pad assembly according to claim 23, wherein said spacer sheet has a top surface which contacts said entry keypad, and wherein said domes are configured and sized such that they extend into said spacer sheet apertures to be substantially flush with said top surface.

29. A touch-pad assembly according to claim 23, wherein said spacer sheet has a top surface which contacts said entry keypad, and wherein said domes received in said spacer sheet apertures are below said top surface.

30. A user interface for a touch pad surface, comprising:
a keypad assembly configured to overlay the touch pad surface and receive and relay input from a user, a key entry mode and a graphic entry mode, said keypad assembly comprising an entry surface configured to allow both key entry mode and graphic entry mode on the same input surface and having a plurality of tactile responsive input surfaces thereon, wherein each of said tactile input surfaces is associated with a key entry surface, and wherein said tactile input surfaces comprise areas of increased resistance such that a user receives tactile affirmation simulating a depressed key.

31. A user interface according to claim 30, wherein said keypad assembly includes an array of protrusions having opposing top and bottom surfaces, said bottom surface configured to overlay and contact the touch-pad surface.

32. A user interface according to claim 31, wherein said keypad assembly includes a unitary spacer sheet overlaying and contacting said array top surface, said spacer sheet including a plurality of apertures, each of said apertures configured and sized to receive at least one of said array of protrusions therein.

33. A user interface according to claim 32, wherein said key and graphic entry pad overlays said spacer sheet opposite said array of protrusions, such that in said key and graphic entry pad inner surface is sized and configured to directly contact the upper surface of said spacer sheet and the upper extending portions of said protrusions, and wherein said entry pad including a plurality of key entry surfaces thereon, wherein said assembly is configured to engage with a touch-pad surface such that in response to a user's depression of one of said key entry surfaces said assembly provides tactile affirmation of the selection to the user and relays the selection to the touch-pad surface.

34. A touch-pad assembly according to claim 30, wherein said entry pad with said key entry surfaces has a substantially planar continuous entry surface to facilitate a smooth graphic entry surface for a user.

35. A touch-pad assembly according to claim 33, wherein said array of protrusions is an array of snap domes.

36. A touch-pad assembly according to claim 33, wherein each of said domes contacts said touch pad surface to define a contact zone representing a corresponding keypad entry.

37. A radiotelephone according to claim 1, wherein said array of snap domes is configured as a substantially continuous polydome sheet.

38. A radiotelephone according to claim 6, wherein said user interface comprises a plurality of key entry spaces, and wherein each of said domes in said snap dome array is aligned with an overlying predetermined key entry space on the user interface surface and with an underlying contact zone on said radiotelephone face touch-pad surface.

39. A radiotelephone according to claim 38, wherein during key mode operation, said radiotelephone is configured such that said underlying radiotelephone face includes an absolute positional relationship between said radiotelephone face touch pad surface and said user interface said absolute positional relationship corresponding to a plurality of contact zones on each of said contact zones defined by position and size of a key overlaying respective entry space on said user interface surface, and wherein during graphic entry mode, said radiotelephone is configured with a relative positional relationship between said radiotelephone face touch pad surface and said user interface surface.

40. A portable communication device according to claim 10, wherein said array of snap domes is configured as a substantially continuous polydome sheet.

41. A touch pad assembly according to claim 21, wherein said array of snap domes is configured as a substantially continuous polydome sheet.

42. A touch pad assembly according to claim 27, wherein each of said domes in said snap dome array is aligned with an overlying one of said key entry surfaces and with an underlying contact zone on said touch pad surface.

43. A touch pad assembly according to claim 42, wherein during key mode operations said touch pad assembly is configured such that said underlying touch pad surface has an absolute positional relationship with said user interface corresponding to a plurality of contact zones defined on said touch-pad surface, said contact zones defined by position, and size of a respective key entry space.

44. A user interface for a touch pad surface according to claim 31, wherein said array of protrusions is configured as a substantially continuous polydome sheet.

* * * * *